US005797520A

United States Patent [19]

Donahue

[11] Patent Number: 5,797,520

[45] Date of Patent: Aug. 25, 1998

[54] METERING SYSTEM AND METHOD FOR USE WITH FLUIDS HAVING A HIGH SOLID CONTENT

[75] Inventor: Lawrence J. Donahue, Rancho Palos Verdes, Calif.

[73] Assignee: Northrop Grumman Corporation, Los Angeles, Calif.

[21] Appl. No.: 718,889

[22] Filed: Sep. 24, 1996

[51] Int. Cl.$^{6}$ .............................. G01F 5/42; G01F 11/00

[52] U.S. Cl. ....................... 222/386.5; 222/394; 222/389; 222/399

[58] Field of Search ................................ 222/386.5, 394, 222/399, 389

[56] References Cited

U.S. PATENT DOCUMENTS

| | | | |
|---|---|---|---|
| 1,731,767 | 10/1929 | Cramer | 222/386.5 |
| 3,270,920 | 9/1966 | Nessler . | |
| 3,662,929 | 5/1972 | Sims | 222/386.5 |
| 3,669,313 | 6/1972 | Marand et al. . | |
| 3,883,046 | 5/1975 | Thompson et al. . | |
| 4,067,485 | 1/1978 | Soin | 222/386.5 |
| 4,147,278 | 4/1979 | Uhlig . | |
| 4,148,416 | 4/1979 | Gunn-Smith . | |
| 4,162,030 | 7/1979 | Capra et al. . | |
| 4,293,353 | 10/1981 | Pelton et al. . | |
| 4,969,577 | 11/1990 | Werding . | |
| 5,025,959 | 6/1991 | Segatz | 222/386.5 |
| 5,069,363 | 12/1991 | Daimler . | |
| 5,115,944 | 5/1992 | Nikolich . | |
| 5,251,787 | 10/1993 | Simson . | |
| 5,301,838 | 4/1994 | Schmidt et al. . | |
| 5,339,989 | 8/1994 | Coleman . | |
| 5,361,941 | 11/1994 | Parekh et al. . | |
| 5,368,195 | 11/1994 | Pleet et al. | 222/386.5 |
| 5,454,488 | 10/1995 | Geier . | |
| 5,575,560 | 11/1996 | Kaneski et al. | 222/386.5 |

*Primary Examiner*—Andres Kashnikow
*Assistant Examiner*—Kent Quinalty
*Attorney, Agent, or Firm*—Terry Anderson; Karl J. Hoch. Jr.

[57] ABSTRACT

An apparatus for dispensing a fluid at a predetermined flow rate by metering a metering liquid. The apparatus including a deformable liner adapted to hold the fluid and a tank having an inner surface defining a tank interior. The tank is adapted to support the deformable liner substantially within the tank interior. The apparatus also includes a metering pump operably connected to the tank and adapted to transfer a metering liquid between the deformable liner and the inner surface of the tank such that the deformable liner will be deformed so as to force the fluid from the tank at a predetermined flow rate as determined by metering the flow rate of the metering liquid through the metering pump.

23 Claims, 2 Drawing Sheets

METERING SYSTEM AND METHOD FOR USE WITH FLUIDS HAVING A HIGH SOLID CONTENT

BACKGROUND OF THE INVENTION

1. Field of Invention

The present invention relates generally to fluid metering systems and, more particularly, to metering systems for use with fluids having a high solid content such as paint.

2. Description of the Related Art

A wide variety of fluids dispensing systems have been introduced over the years. These systems have been used to dispense measured quantities of fluids including, but not limited to, water, paints, adhesives, lubricants, chemicals, acids and condiments (i.e. mustard, mayonnaise and catsup).

In one type of system, the fluid is stored in a container which is connected to a pump by a first conduit. The pump is then connected to a dispenser, such as a valved nozzle, by a second conduit. The fluid is drawn through the pump and supplied to the nozzle under pressure. In situations where highly accurate dispensing is required, a precision metering pump may be used. Although useful, this type of system suffers from a number of disadvantages. The primary disadvantage relates to the fact that the fluid must pass through the pump on its way to the nozzle. As a result, the dispensed fluid will often clog the intricate passage ways and gears of the metering pump. This is especially true in the case of high solid content paints.

In a second type of system, the so-called "bag in a container" systems, the fluid to be dispensed is stored in a collapsible liner which is itself mounted within a container. The collapsible liner and container have an opening and the openings are typically sealed with a cap (or fitting) that includes a dispensing conduit. One end of the dispensing conduit is secured to a dispenser, such as a spray gun with a trigger, and the other end receives fluid from the liner. The container (or cap) also includes an opening which receives pressurized gas. The gas fills the space between the interior of the container and the collapsible liner. The pressure of the gas causes the liner to collapse, thereby forcing the liquid from liner into the dispensing conduit.

OBJECT AND SUMMARY OF THE INVENTION

The "bag in a container" systems eliminate the problems caused by drawing the dispensed fluid through a pump. However, the inventor herein has discovered that these systems suffer from other shortcomings. One such shortcoming relates to level of precision which may be achieved by these systems when used in conjunction with certain high solid content liquids. In the systems known heretofore, the flow rate of the dispensed liquid was controlled by controlling the gas pressure within the container. This method of flow control works well with Newtonian fluids, i.e. fluids with a constant viscosity. Many high solid content fluids, however, are not Newtonian and are considered thixotropic because of the large variation in viscosity versus shear rate. Because gas is highly compressible, the use of gas to collapse the liner does not result in the precise displacement of non Newtonian fluids from the liner.

Accordingly, a general object of the present invention is to provide a metering system that is superior to those presently known in the art. In particular, one object of the present invention is to provide an apparatus that may be used to dispense high solid content fluids in a manner that is more precise than that presently known in the art. Another object of the present invention is to precisely dispense (or meter) high solid content fluids in a manner which will not clog the pumping equipment used therewith.

In accordance with one aspect of the present invention, these and other objectives are accomplished by providing a tank adapted to support a deformable liner substantially within the tank in such a manner that the fluid is associated with the first side of the liner and a pump operably connected to the tank and adapted to transfer a liquid between the second side of the liner and the inner surface of the tank. The liquid will cause the liner to deform and thereby force fluid from the interior of the tank to, for example, a dispenser such as a spray gun.

This combination results in a number of advantages over prior dispensing systems. For example, because liquid is relatively incompressible, the rate at which the dispensed fluid will be forced from the tank may be precisely controlled by precisely controlling the rate at which the liquid is pumped between the inner surface of the tank and the liner. Such precise pumping may be easily performed by a metering pump. In addition, because the dispensed fluid flows from the tank to the spray gun or other dispensing device without passing through the pump, the pump clogging problems discussed above are advantageously eliminated. The liquid which does pass through the pump, i.e. the liquid which is used to deform the liner, may be water or a water/lubricant mixture which will not clog the pump.

Accordingly, the present invention is capable of precisely dispensing fluids, including high solid content fluids, in a manner that is far superior to that presently known in the art. Many other features and attendant advantages of the present invention will become apparent as the invention becomes better understood by reference to the following detailed description considered in conjunction with the accompanying drawings.

BRIEF DESCRIPTION OF THE DRAWINGS

Detailed description of the preferred embodiment of the invention will be made with reference to the accompanying drawings.

DETAILED DESCRIPTION OF THE PREFERRED EMBODIMENT

The following is a detailed description of the best presently known mode of carrying out the invention. This description is not to be taken in a limiting sense, but is made merely for the purpose of illustrating the general principles of the invention. The scope of the invention is defined solely by the appended claims.

Figure 1:
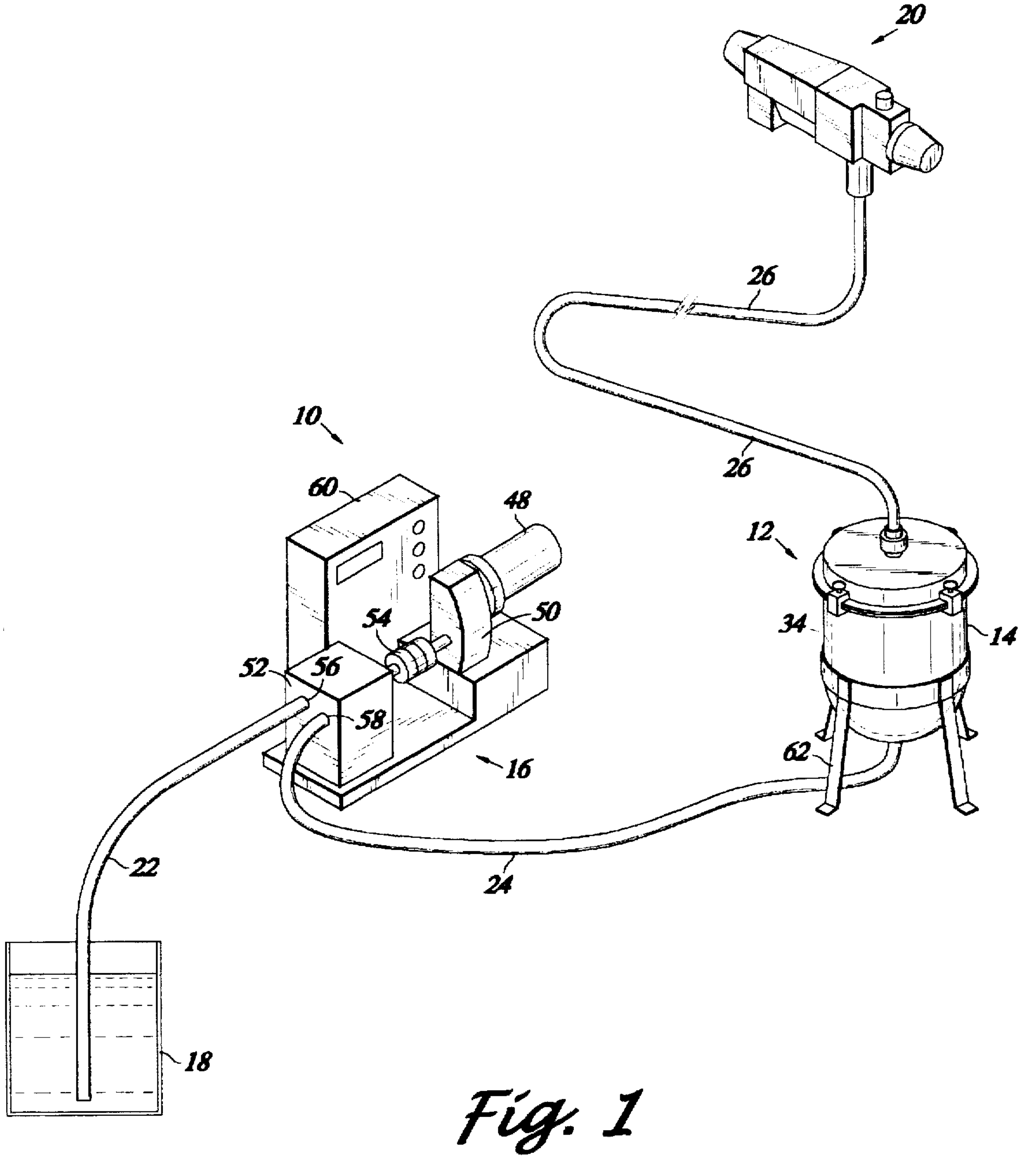
FIG. 1 his overview of a metering system in accordance with a preferred embodiment of the present invention.

As illustrated for example in FIG. 1, a preferred embodiment of the present metering system 10 includes a pressure tank 12 and a deformable liner 14 which is mounted within the interior of the tank 12. The liner 14 is used to support a fluid, such as paint, which will be dispensed from the tank. A pump unit 16, such as a precision metering pump unit, is used to draw a metering liquid from a container 18 and supply the metering liquid under pressure to the interior of the tank 12. As will be discussed in greater detail below, the metering liquid is supplied to a space between the inner surface of the tank 12 and the outer surface of the liner 14. The outer surface of the liner may, of course, contact the inner surface of the tank prior to introduction of the metering fluid, thereby eliminating the space. The metering liquid applies pressure to the liner 14, thereby forcing the fluid from within the tank and, ultimately, to a dispensing device such as a spray gun 20. A series of suitable conduits 22, 24 and 26 connect the container 18 to the metering pump unit 16, the metering pump unit 16 to the pressure tank 12, and the pressure tank 12 to the dispenser 20.

Figure 2:
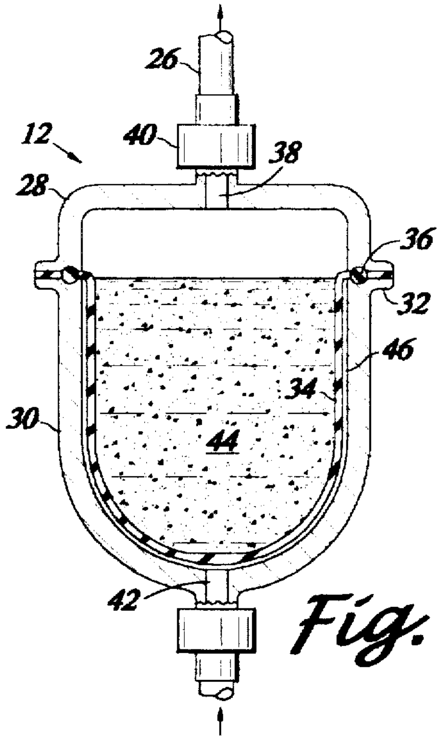
FIG. 2 is a section view of a tank and deformable liner apparatus which may be used in conjunction with the preferred embodiment shown in FIG. 1.
Figure 3:
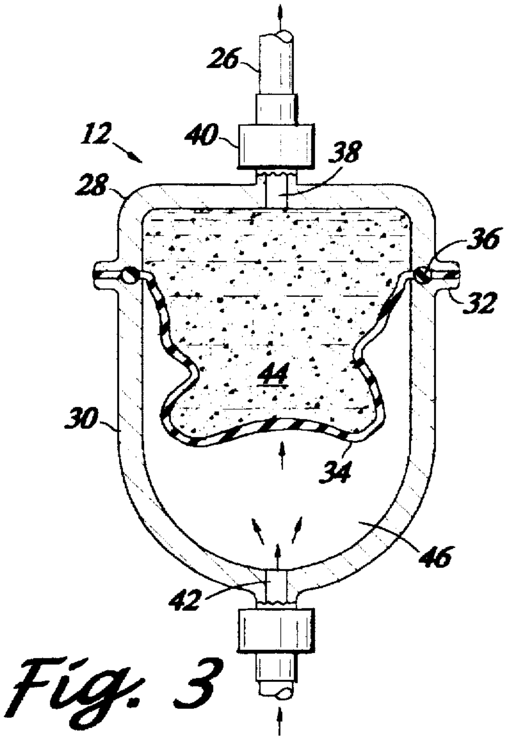
FIG. 3 is a section view of a tank and deformable liner apparatus shown in FIG. 2 with the liner partially deformed.

Turning to FIGS. 2 and 3, the exemplary pressure tank 12 includes upper and lower tank members 28 and 30 which are secured to one another by a clamp 32. The clamp includes a locking mechanism which is not shown. The clamp may, however, be eliminated and replaced by a series of bolts. In the illustrated embodiment, the deformable liner 14 is in the form of a deformable bladder 34. The outer perimeter of the deformable bladder 34 includes a gasket 36 which, along with the outer perimeter of the bladder, is sandwiched between the tank members 28 and 30. The upper tank member 28 includes a threaded outlet 38. A threaded cap 40, which supports the conduit 26, may be secured to the outlet 38. The lower tank member 30 includes a metering liquid inlet 42 through which the metering liquid enters the tank.

When the exemplary pressure tank 12 is arranged in the manner described in the preceding paragraph, a space 44 is formed between one side of the bladder 34 and the interior of the upper tank member 28. Similarly, a space 46 is located between the interior of the lower tank member 30 and the other side of the bladder 34. When metering liquid is pumped through the inlet 42 into space 46, the bladder 34 will deform in the manner shown in FIG. 3. As a result, the fluid stored in space 44 (between the bladder 34 and the upper tank member 28) will be forced through the outlet 38 and into the conduit 26 which leads to the dispensing device 20.

The material used for the bladder should be selected in accordance with the characteristics of the substance that will be dispensed. For example, a bladder that is to be used in conjunction with paint could be made of polyethylene or polypropylene and be approximately 10–30 mils thick. Other materials, such as Nylon or Teflon, may also be used depending on the particular application. The metering fluid is preferably water. In order to prolong the life of the metering pump unit 16, a mixture of water and a lubricant such as glycerol may also used.

The exemplary metering pump unit 16 includes a motor 48 that is connected to a gear box 50, which is in turn connected to a pump 52 by a shaft coupler 54. The pump 52 includes an inlet 56 and an outlet 58. Suitable pumps include the H-Series gear pumps sold by the Zenith Pumps Division of the Parker Hannifin Corporation, P.O. Box 1405, Sanford, N.C. 27331-1405. A controller 60 may also be provided in order to enable the user to run the pump at different speeds, thereby controlling the rate of flow from the dispensing device 20. The flow rate from the exemplary dispensing device is related to the size of the pump, the speed of the motor and the gearing in the drive train.

Figure 4:
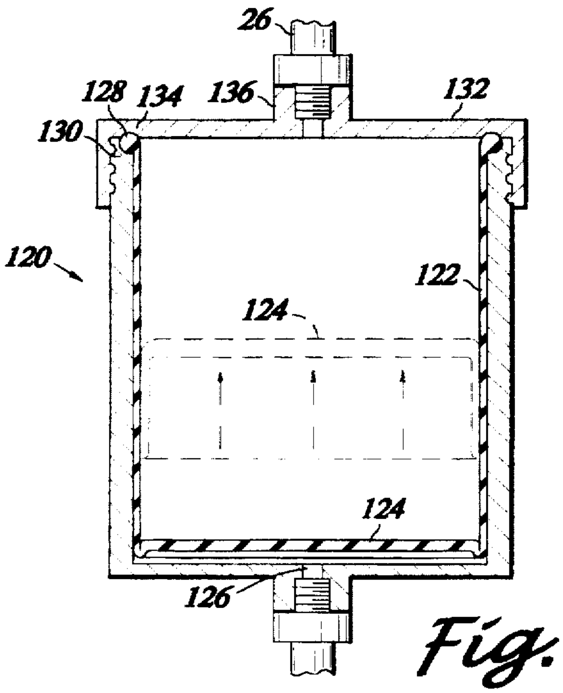
FIG. 4 is a section view of another tank and deformable liner apparatus which may be used in conjunction with the preferred embodiment shown in FIG. 1.

A second exemplary pressure tank is shown in FIG. 4. Here, the pressure tank 120 includes a rigid tank member 122 and a deformable liner 124 (or bag) which is shaped so as to correspond to the interior of the rigid tank member. The liner 124 will deform (or collapse) as metering fluid enters the pressure tank 120 through an inlet 126. The liner 124 includes a top lip 128 that rests on the rim 130 of the tank member 122 and acts as a gasket to effect a tight seal. The pressure tank 120 also includes a threaded cap 132 which mates with corresponding threads near the rim 130 of the rigid tank member. The inner surface of the cap includes a depression 134 which is adapted to receive the top lip 128 of the liner and further effect the seal. The cap also includes an outlet 136 which may be connected to the conduit 26 in any suitable manner.

The liner 24 is preferably reusable and composed of materials such as polyethylene, polypropylene, Nylon and Teflon and is 10–30 mils thick. In those applications where a disposable liner is required, the liner may simply be made thinner or from less durable materials.

The exemplary pressure tanks may be mounted on a series of legs 62, such as those shown in FIG. 1. However, the tank 12 may also be suitably sized and provided with a handle so that it may be carried by an operator. When the dispensing device 20 is a hand held dispensing device with a trigger that allows the user to dispense fluid at will, the pressure tank 12 may be provide with a pressure sensor (not shown) that is connected to the controller 60. When the pressure within the tank reaches a predetermined level, the controller will prevent additional metering liquid from being pumped to the tank. The pressure tank may also be incorporated into a robotic painting apparatus, as may the metering pump and metering liquid container. Here, starting and stopping the dispensing process may be performed by simply starting and stopping the pump.

Although the present invention has been described in terms of the preferred embodiment above, numerous modifications and/or additions to the above-described preferred embodiments would be readily apparent to one skilled in the art. By way of example, but not limitation, the separate pressure tank and liner arrangement may be replaced with a single disposable multi-layer bottle that includes both of these elements. A suitable multi-layer bottle is shown in U.S. Pat. No. 5,301,838. It is intended that the scope of the present invention extends to all such modifications and/or additions and that the scope of the present invention is limited solely by the claims set forth below.

What is claimed is:

1. The apparatus for dispensing a fluid to be dispensed at a predetermined flow rate by metering a metering liquid, the apparatus comprising:

a tank including a substantially rigid outer portion defining an interior, a first aperture and a second aperture;

a deformable inner liner, located substantially within the interior of the outer portion, defining first and second sides and adapted to store a fluid to be disposed in such a manner that the fluid is associated with the first side, the first side of the inner liner being associated with the first aperture of the outer portion of the tank and the second side of the inner liner being associated with a second aperture of the outer portion of the tank;

a dispenser adapted to dispense fluid;

a dispensing conduit operably connected to the dispenser and to the first aperture;

a metering liquid container for storing a metering liquid; and a metering pump operably connected to the second aperture and the metering liquid container such that the metering liquid will be drawn from the metering liquid container and pumped through the second aperture between the rigid outer portion of the tank and the second side of the deformable inner liner, thereby deforming the inner liner and forcing the fluid to be dispensed through the first aperture, the dispensing conduit and the dispenser at a predetermined flow rate as determined by metering the flow rate of the metering liquid through the metering pump.

2. The apparatus as claimed in claim 1, wherein the metering liquid comprises a water and a lubricant mixture.

3. The apparatus as claimed in claim 1, wherein the deformable inner liner comprises a bladder.

4. The apparatus as claimed in claim 1, wherein the deformable inner liner comprises a collapsible bag.

5. The apparatus for dispensing a fluid at a predetermined flow rate by metering a metering liquid, the apparatus comprising:

a deformable liner adapted to hold the fluid and defining a first side and a second side;

a tank having an inner surface defining a tank interior, the tank being adapted to support the deformable liner substantially within the tank interior such that the fluid is associated with the first side; and a metering pump operably connected to the tank and adapted to transfer a metering liquid into the tank between the second side of the deformable liner and the inner surface of the tank such that deformable liner will be deformed, thereby forcing the fluid from the tank at a predetermined flow rate as determined by metering the flow rate of the metering liquid through the metering pump.

6. The apparatus as claimed in claim 5, wherein the pump comprises a metering pump.

7. The apparatus as claimed in claim 5, wherein the liquid comprises water.

8. The apparatus as claimed in claim 5, wherein the liquid comprises a water and lubricant mixture.

9. The apparatus as claimed in claim 8, wherein the lubricant comprises glycerol.

10. The apparatus as claimed in claim 5, wherein the deformable liner includes an opening and a boundary around the opening, the tank includes an open end and a cover adapted to substantially seal the open end, and the liner is supported within the tank in such a manner that the cover engages the boundary.

11. The apparatus as claimed in claim 5, wherein the tank comprises a substantially rigid tank.

12. The apparatus as claimed in claim 5, wherein the tank includes an open longitudinal end, a cover adapted to substantially seal the open longitudinal end, a closed longitudinal end, and an aperture formed in the closed longitudinal end connected to the pump.

13. The apparatus as claimed in claim 5, further comprising:

a dispenser operably connected to the interior of the tank.

14. The apparatus as claimed in claim 13, wherein the dispenser comprises a spray gun.

15. The apparatus as claimed in claim 13, wherein the dispenser comprises a nozzle.

16. The apparatus as claimed in claim 5, wherein the deformable liner comprises a bladder.

17. The apparatus as claimed in claim 5, wherein the deformable liner comprises a collapsible bag.

18. A method of dispensing a fluid at a predetermined flow rate by metering a metering liquid, the method comprising the steps of:

providing a tank having an inner surface defining a tank interior;

positioning a deformable liner substantially within the tank interior such that the fluid will be supported by a first side of the deformable liner and a second side of the deformable liner will be adjacent the inner surface of the tank; and introducing a metering liquid between the inner surface of the tank and the second side of the deformable at a metered flow rate at a level of pressure sufficient to deform the deformable liner and force fluid stored within the tank from the tank at the predetermined flow rate as determined by the metered flow rate of the metering liquid.

19. The method as claimed in claim 18, wherein the step of introducing a liquid between the inner surface of the tank and the second side of the deformable liner comprises pumping the liquid with a metering pump.

20. The method as claimed in claim 18, wherein the step of introducing a liquid between the inner surface of the tank and the second side of the deformable liner comprises introducing water.

21. The method as claimed in claim 18, wherein the step of introducing a liquid between the inner surface of the tank and the second side of the deformable liner comprises introducing a water and lubricant mixture.

22. The method as claimed in claim 18, further comprising the step of:

transferring the fluid forced from the tank to a dispenser operably connected to the tank.

23. The method as claimed in claim 18, further comprising the step of:

transferring the fluid forced from the tank to a spray gun operably connected to the tank.

* * * * *